United States Patent [19]

Hazebrook et al.

[11] Patent Number: 4,941,862
[45] Date of Patent: Jul. 17, 1990

[54] QUICK DISCONNECT CONSTANT VELOCITY UNIVERSAL JOINT

[75] Inventors: Daniel W. Hazebrook, Detroit; Steven C. Hahn, Mt. Clemens, both of Mich.

[73] Assignee: GKN Automotive Inc., Auburn Hills, Mich.

[21] Appl. No.: 170,944

[22] Filed: Mar. 21, 1988

Related U.S. Application Data

[60] Division of Ser. No. 945,183, Dec. 23, 1986, Pat. No. 4,753,626, which is a continuation of Ser. No. 704,196, Feb. 22, 1985, abandoned.

[51] Int. Cl.[5] .............................................. F16D 3/221
[52] U.S. Cl. ................................. 464/141; 81/177.75; 81/177.85; 464/901; 464/906
[58] Field of Search ....................... 81/177.75, 177.85; 403/325, 328; 464/139, 141, 901, 906

[56] References Cited

U.S. PATENT DOCUMENTS

| 3,180,435 | 4/1965 | McHenry | 464/901 X |
| 3,802,221 | 4/1974 | Kimata | 464/141 |
| 4,245,528 | 1/1981 | Hugh et al. | 81/177.85 |

FOREIGN PATENT DOCUMENTS

| 361323 | 12/1972 | U.S.S.R. | 464/141 |
| 573631 | 9/1977 | U.S.S.R. | 464/141 |

*Primary Examiner*—Daniel P. Stodola
*Attorney, Agent, or Firm*—Remy J. VanOphem

[57] ABSTRACT

A quick disconnect constant velocity universal joint for transmitting driving torque between rotative members, such quick disconnect univeral joint including a pintle-type inner joint member fixed to one of the rotative members and an outer member fixed to the other of the rotative members, with a plurality of roller balls received in apertures in the inner joint member, and having the roller balls engaged in grooves in the outer joint member, with a spherical portion of at least one of each of the roller balls being in contact with a spherical portion of at least one of the other roller balls in a manner whereby the roller balls provide mutual support for each other inwardly of the inner joint member towards the center of the joint. An externally actuated plunger allows the roller balls to be displaced which permits the inner joint member to be separated from the outer joint member.

10 Claims, 4 Drawing Sheets

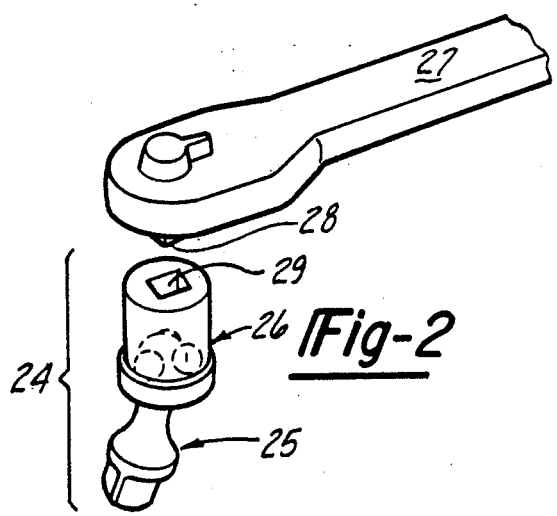
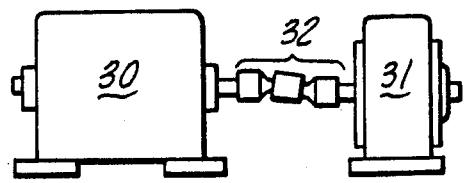
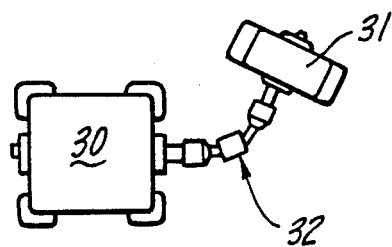
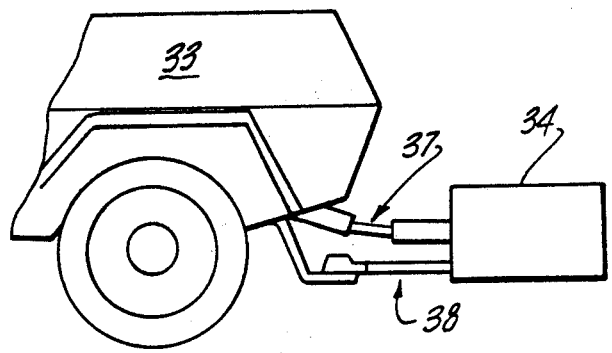
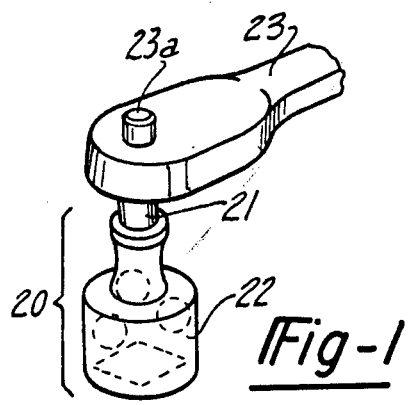
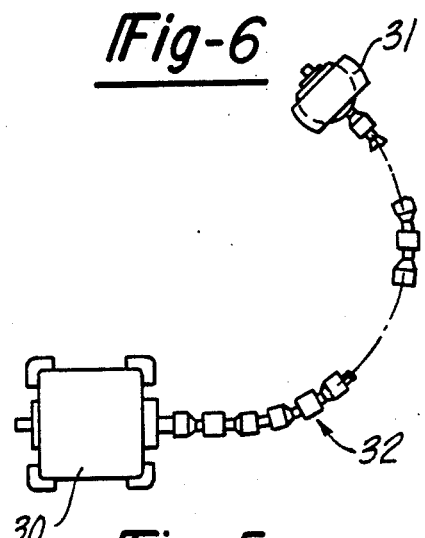

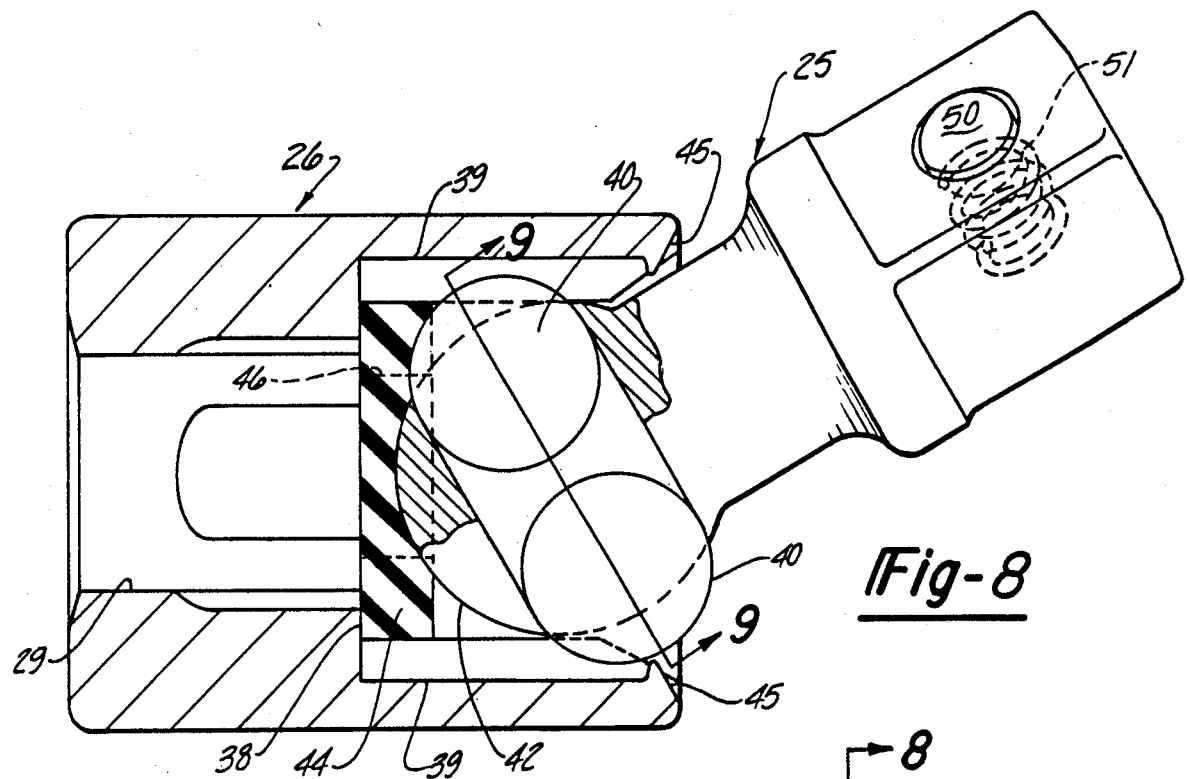
Fig-8
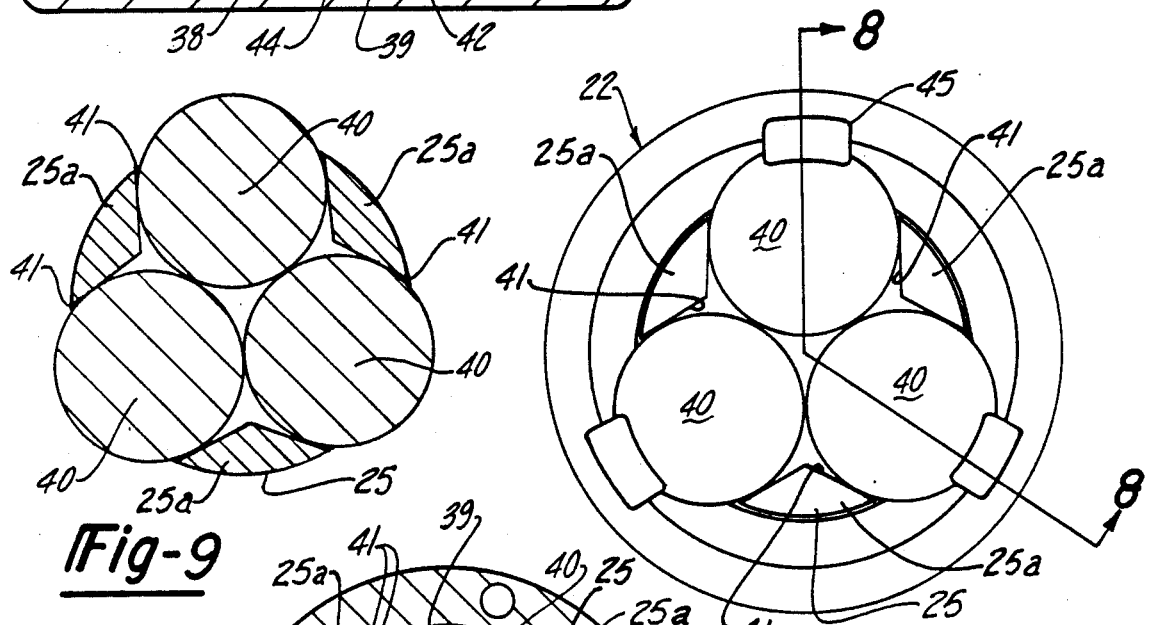
Fig-9
Fig-7
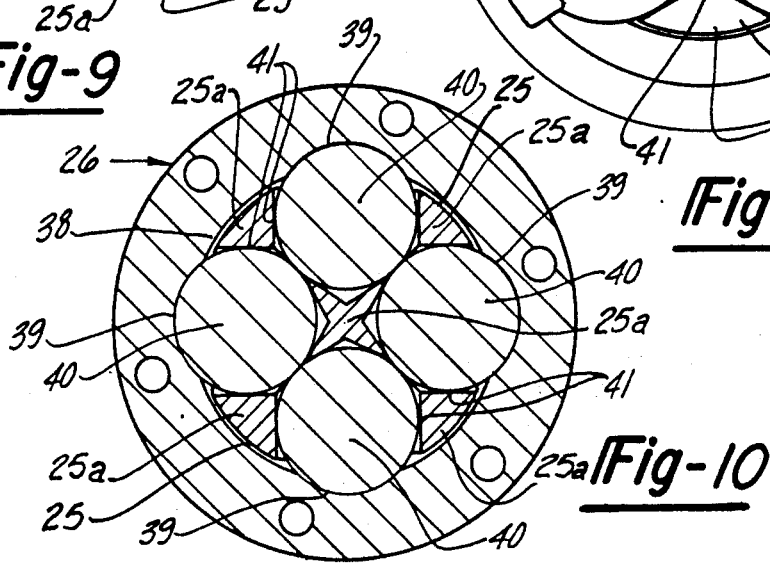
Fig-10

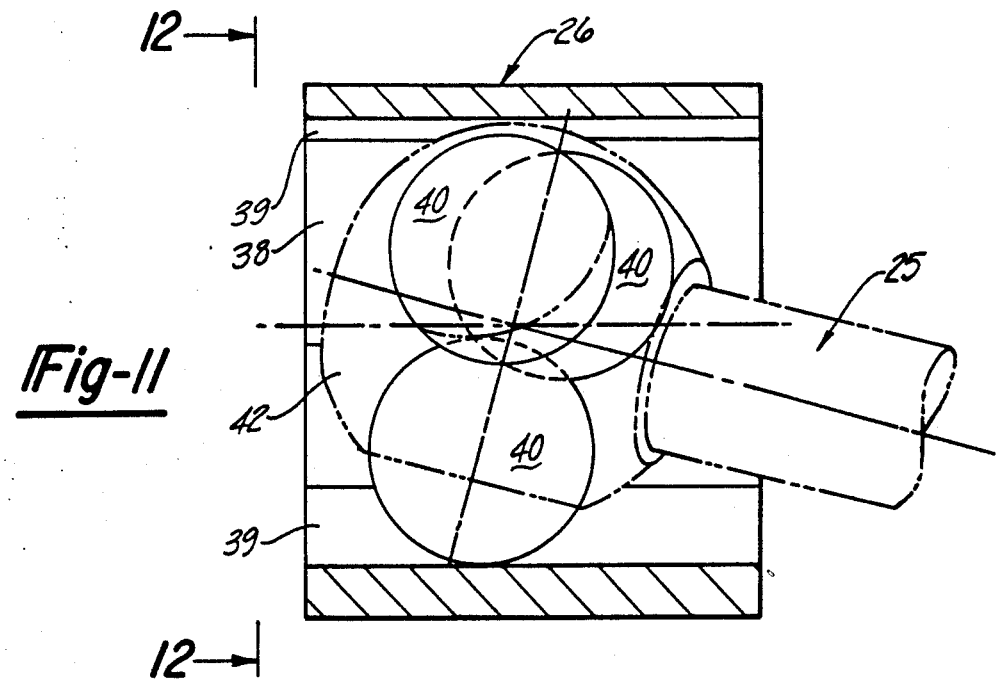
*Fig-11*
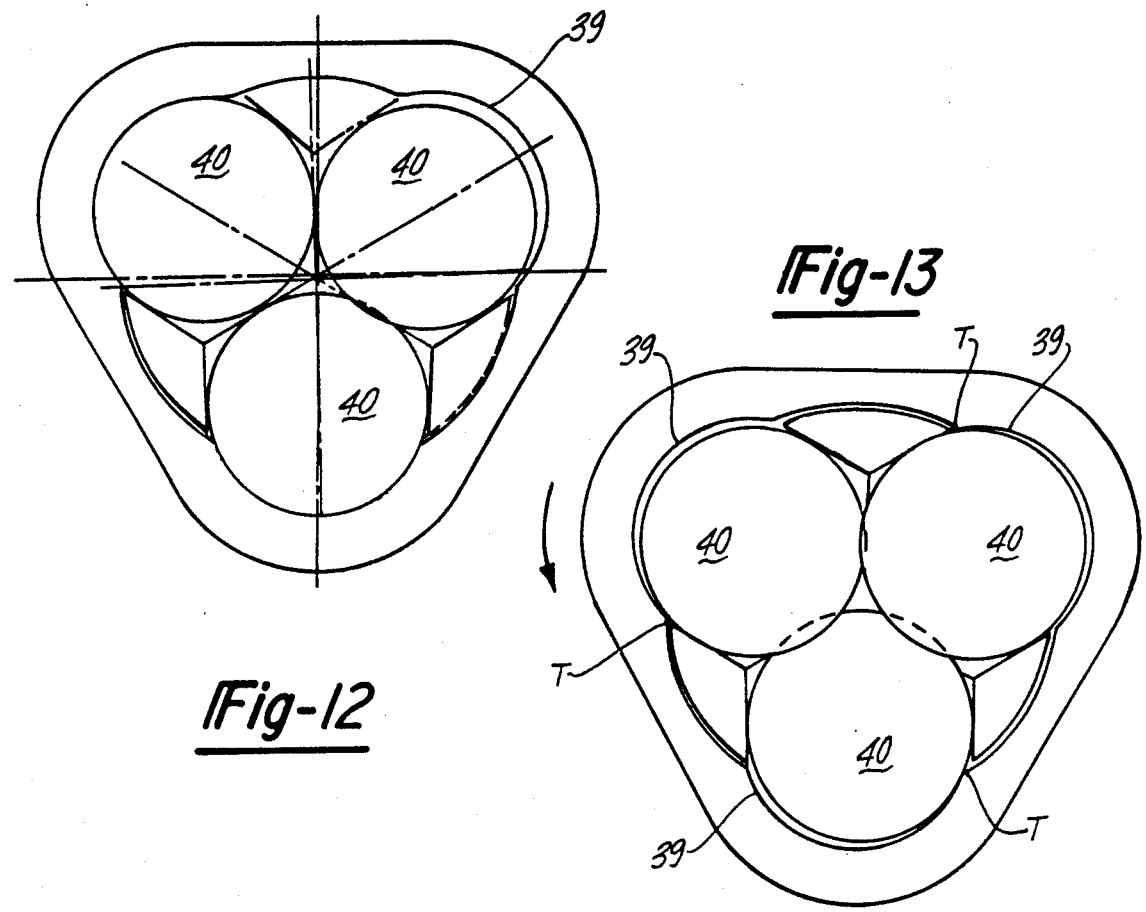
*Fig-12*
*Fig-13*

QUICK DISCONNECT CONSTANT VELOCITY UNIVERSAL JOINT

This is a division of application Ser. No. 945,183, filed Dec. 23, 1986, now U.S. Pat. No. 4,753,626 which is a continuation of Ser. No. 704,196, filed Feb. 22, 1985, now abandoned.

BACKGROUND OF THE INVENTION

1. Field of the Invention

The present invention relates to constant velocity universal joints for connecting drive and driven members and, more particularly, the invention relates to universal joints embodying means for achieving constant velocity drive between the drive and driven members when the members are in high speed operation, offset at an angle, or have misalignment between the members. The apparatus achieves this with roller balls which are free to rotate in any direction. A multiplicity of such joints can be cascaded, or connected in series, to increase the degree of offset or misalignment that can be accommodated between the drive and driven members and/or the spacing therebetween. One embodiment of the system allows the ball joint to readily separate, thus making a quick positive disconnect.

2. Description of the Prior Art

Many efforts are shown in the known prior art to achieve better transmission of torque. These usually involve either a Cardan-type joint, such as shown in U.S. Pat. No. 4,156,354, or a constant velocity joint of the type shown in U.S. Pat. No. 2,910,845. Each of these devices involve transmission of torque between rotative members and can be said to involve an inner joint member fixed to one of the rotative members, and an outer joint member fixed to the other of the rotative members.

U.S. Pat. No. 4,156,354 shows a high-speed, high-torque transmitting joint where the torque is transmitted through roller bodies interposed between inner and outer joint members wherein the roller bodies are equidistantly spaced circumferentially of the joint assembly, with each roller body being received in planar recesses in the inner joint member for radially slidable engagement relative thereto. This construction increases the complexity and size of the joint, and requires close maintenance of surface finish and other manufacturing tolerances. Because of these reasons and the increased friction resulting from the sliding relationship of the planar surfaces, this type of joint has decreased smoothness of operation, while at the same time having increased manufacturing costs.

U.S. Pat. No. 2,910,845 shows a constant velocity universal joint intended for connecting two rotative members only where angularly misaligned joints are to be found, and not where axially aligned or slightly misaligned joints are to be found and, therefore, shows a joint limited in its usefulness. Further, the joint utilizes spherical drive members restrained to rotate about journals provided on the drive member. The restraining of the drive members provides increased friction, which is unsatisfactory in a universal joint.

What is needed to solve the above problems present in the prior art is an improved constant velocity universal joint usable for angular and axial misalignment and having increased smoothness of operation due to the elimination of planar surfaces on the drive members and which can be made with lower manufacturing costs because of less critical tolerances and surface finishes. In addition, increased friction results because of the sliding relationship of the planar surfaces. For these reasons, it provides a generally unsatisfactory solution to the problem of torque transmission.

U.S. Pat. No. 2,910,845 utilizes spherical drive members restrained to rotate about journals provided on the drive member which again causes increased friction and is unsatisfactory

SUMMARY OF THE PRESENT INVENTION

Briefly, the present invention may be described as a constant velocity universal joint for transmitting driving torque including a pintletype inner joint member fixed to one of the rotative members and an outer joint member fixed to the other of the rotative members, with a plurality of roller balls received in an aperture in the inner joint member, and having the roller balls engaged in groove means in the outer joint member, with a spherical portion of at least one of each of the roller bodies being in contact with a spherical portion of at least one of the other roller bodies in a manner whereby the roller bodies provide mutual support for each other inwardly of the inner joint member towards the center of the joint. A quick disconnect version of the invention is also shown. Additionally, a cascaded joint made up of a multiplicity of such universal joints is also shown.

The combination of the unrestricted rotation of the roller balls in the inner joint member, the mutual support provided by the roller ball cluster, and the movement of the roller balls in the grooves placed about the circumference of the outer member provides for constant velocity torque transmission with a minimum of effort and vibration. The joint will remain a constant velocity joint until the inner joint member is articulated past approximately eight (8°) degrees, which it is contemplated will cover a large number of uses for the present invention.

Thus, it is an object of the present invention to provide a constant velocity universal joint having unrestricted rotation of the roller balls utilized therein.

It is a further object of the present invention to provide a constant velocity universal joint having the roller balls utilized therein travel in rectilinear grooves in the outer member thereof, the rectilinear grooves having cylindrical ball contact surfaces.

A further object of the present invention is to provide that the roller balls used in transmitting torque in a constant velocity universal joint are all in contact with each other.

A further object of the present invention is to provide that the plane of torque transmission of the universal joint does not remain perpendicular to the axis of rotation as the joint is articulated.

A further object of the present invention is to provide a constant velocity universal joint with lower manufacturing costs than present day devices.

A further object of the present invention is to provide a constant velocity universal joint which eliminates the use of planar drive surfaces in the transmission of torque.

A further object of the present invention is to provide a constant velocity universal joint having increased performance.

A further object of the present invention is to provide a constant velocity universal joint having less critical manufacturing tolerances.

A further object of the present invention is to provide an improved constant velocity joint which is capable of transmitting torque over a smaller moment arm than prior art universal joints, thereby providing smaller size joints with smoother operation.

A still further object of the present invention is to provide a constant velocity universal joint that can be connected in series with a multiplicity of like universal joints in a cascaded joint to provide for relatively large amounts of offset or misalignment between the drive and driven members which are connected by such joints.

Further objects and advantages of the present invention will be apparent from the following description and appended claims, reference being made to the accompanying drawings forming a part of this specification, wherein like reference characters designate corresponding parts in the several views.

BRIEF DESCRIPTION OF THE DRAWINGS

FIG. 1 is a diagrammatic view of a novel wrench embodying the universal joint of the present invention as the wrench drive;

FIG. 2 is a diagrammatic view illustrating a construction embodying the present invention being in conjunction with a standard ratchet wrench of the square drive type;

FIG. 3 is a diagrammatic view showing a construction embodying the present invention being utilized where an offset between adjoining torque transmitting shafts is present;

FIG. 4 is a diagrammatic view showing a construction embodying the present invention in use where angular misalignment and/or offset is desired;

FIG. 5 is a diagrammatic view showing a construction embodying a multiplicity of universal joints of the present invention connected in series in a cascaded joint;

FIG. 6 is a diagrammatic view illustrating a construction embodying the present invention being used in a power take-off system;

FIG. 7 is a right end view of the outer joint member with the inner joint member in axial alignment with the outer member and partially cutaway;

FIG. 8 is a sectional view taken in the direction of the arrows along the section line 8—8 of FIG. 7;

FIG. 9 is a sectional view taken in the direction of the arrows along the section line 9—9 of FIG. 8;

FIG. 10 is a view similar to that of FIG. 7 but showing a version of the present invention having four roller balls instead of three;

FIG. 11 is an elevational view of a single constant velocity universal joint, partly in section, showing the inner joint member articulated;

FIG. 12 is a sectional view taken in the direction of the arrows along the section line 12—12 of FIG. 11, and showing the universal joint at rest;

FIG. 13 is a view identical to FIG. 12, but showing the single constant velocity universal joint under operating conditions with torque applied to the inner joint member in the direction of the arrow;

Figure 14:
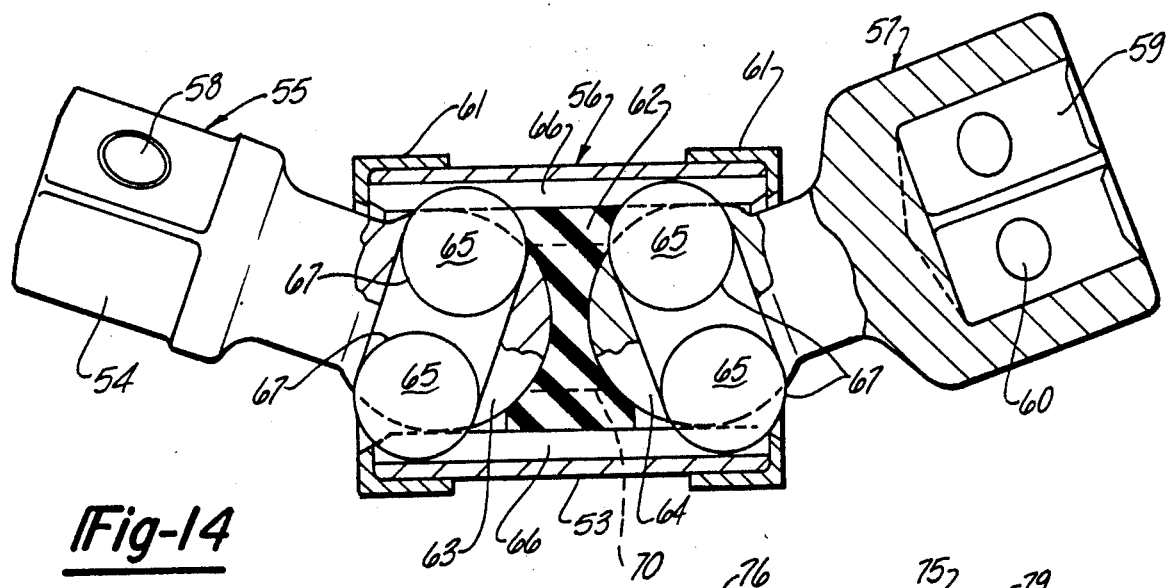
FIG. 14 is an elevational view, partly in section, of a double constant velocity universal joint.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description, and not of limitation.

DETAILED DESCRIPTION OF THE PREFERRED EMBODIMENT

Referring to FIGS. 1 through 6, several uses of the present invention are shown. In FIG. 1 there is shown a novel ratchet wrench 23 having a constant velocity universal joint, generally designated by the numeral 20, included as an integral part thereof. The constant velocity universal joint 20 may be considered to be of the quick disconnect type, as hereinafter described, with the disconnect feature being actuated by a spring-loaded push button 23a. The joint 20 itself is made up of an outer joint member 22 and an inner joint or pintle member 21. The wrench 23 with the integral inner joint member 21 may be part of a set which includes a multiplicity of different sizes of sockets, each of which can interchangeably be assembled to the inner joint member 21 to serve as an outer joint member. It is, of course, also contemplated that other tools, such as screwdriver-type tools, pneumatic wrenches and other tools, and electric wrenches and other tools can be constructed with an integral constant velocity universal joint.

In FIG. 2 there is shown a conventional ratchet wrench 27 of the square drive type, the drive being provided through an extension 28 which is square in cross-section, as is known in the art. The extension 28 fits into a socket 29 provided in an outer joint member 26 of a constant velocity universal joint 24. The universal joint 24 is of the non-quick disconnect type, as hereinafter described, and is made up of an inner joint or pintle member 25. It is also contemplated that the universal joint 24 can be applied to other types of driven tools, such as screwdrivers, pneumatic wrenches and screwdrivers, and electric wrenches and screwdrivers.

In FIG. 3 there is shown an application where offset and possible variation in axial spacing exists between the shaft of a motor 30 and the driveshaft of a gear box 31. The motor and gear box are shown joined by a double constant velocity universal joint 32 embodying the construction used in the present invention.

FIG. 4 shows the same motor and gear box as shown in FIG. 3 but under a condition where angular misalignment and/or offset is desired. Again, the shaft of the motor 30 and the driveshaft of the gear box 31 are joined by a double constant velocity universal generally designated by the numeral 32.

FIG. 5 shows an application where a substantial offset exists between the shaft of the motor 30 and the driveshaft of the gear box 31. The motor and the gear box are joined by a cascaded series of universal joints 32 embodying the construction used in the present invention.

There is shown in FIG. 6 a situation where the construction of the present invention is used as a power take-off. A source of power such as a farm implement is illustrated by the numeral 33 and, thus, is towingly connected to a power actuated attachment 34. The implement 33 provides a driving force for the operation of the power attachment 34. In this case, a quick disconnect, single universal U-joint 37 is utilized in providing this driving force.

Referring now to FIGS. 7 and 8, the outer joint member 26 has the socket 29 provided in one end thereof to receive the ratchet wrench 27 shown in FIG. 2, or any other device to be driven. Immediately adjacent the socket 29 is an enlarged portion 38 having three rectilinear circumferentially spaced grooves 39. The grooves 39 may be spaced equally around the circumference, and have a right circular cylindrical shape in a plane extending transversely through the outer joint member 26 to receive the three spherical roller balls 40. In the single constant velocity universal joint the enlarged portion 38 of the outer joint member 26 receives the inner joint member, generally designated by the numeral 25. Before insertion, the three spherical roller balls 40 are inserted in circular apertures 41 provided in the head portion 42 of the inner joint member 25. The inner joint member 25 having the spherical roller balls 40 inserted therein is then, in turn, inserted into the enlarged portion 38 of the outer joint member 26 until the head portion 42 of the inner joint member 25 contacts a position washer 44. Slight additional force is then applied and the deformations 45 of the outer joint member are deformed, by staking or otherwise, a distance sufficient to prevent removal of the inner joint member 25.

Several considerations are important when the dimensions of the single constant velocity universal joint are considered. The circular apertures 41 in the head portion 42 of the inner joint member 25 must be such as to allow free rotation of the roller balls 40 between the segment portions 25a and ball-to-ball contact among the roller balls. The dimension across the grooves 39 of the outer joint member 26 must be such that when the inner joint member 25 is axially aligned with the outer joint member 26 there is a rolling plunge fit between the roller balls 40 and the rectilinear grooves 39.

The position washer 44 is preferably made of resilient material, such as duro nitrile or the like, and the relationship between the position washer and the deformations 45 must be such that the position washer 44 exerts enough pressure against the head portion 42 of the inner joint member 25 such that the pintle member, when articulated, will be able to hold any angle at which it is placed under its own weight. This feature conforms to a Society of Automotive Engineers standard. One source for the duro nitrile material used to make the position washer is Goshen Rubber Company. If desired, an aperture 46 may be provided in the position washer 44.

In addition, the deformations must be such as to keep all the roller balls 40 in the rectilinear grooves 39 when the inner joint member 25 is at its full angular articulation. The deformed areas are to allow no free axial movement, and they are not to interfere with the rotation of the shaft when it is at an angle of up to thirty degree (30°) from the outer joint member 26.

It can be seen that with this construction there is ball-to-ball contact between the spherical roller balls 40, and that all the torque is transmitted through the roller balls 40 to the rectilinear spherical grooves 39.

It is contemplated that a version of the present invention utilizing four roller balls may be constructed as shown in FIG. 10, and used when large amounts of torque are to be transmitted. As before, there are a plurality (in this case four) of rectilinear grooves 39 equally spaced around the circumference of the enlarged portion 38 of the outer joint member 26. The circular in the inner joint member 25 must meet the same requirements as before, and the four apertures 41 are provided at right angles to each other. In this case the cross-section of the inner joint member 25 is reduced, so that some material is left to strengthen the inner joint member at the center thereof, as indicated by the numeral 25a, and ball-to-ball contact among the four spherical roller balls 40 is still maintained. It must be understood that torque transmission in any of these devices takes place mainly because of the interaction of the roller balls 40 in the spherical rectilinear grooves 39. It can be easily seen that versions of the present invention having more than four roller balls may be provided.

As shown in FIG. 8, to provide for easy attachment of the inner joint member or pintle 25 to a socket, not shown, or other device for receiving torque from the universal joint, the inner joint member 25 is provided with a standard ball detent in the form of a ball bearing 50 held in place by the spring 51.

Referring now to FIG. 11, there is shown a version of the single constant velocity universal joint having a different outer configuration from the device above described. The socket 29 thereof is not shown for ease of illustration. As before, the outer joint member 26 has an enlarged portion 38 having a plurality of spaced rectilinear grooves 39 in which a plurality of roller balls 40 are received. The grooves 39 are preferably cylindrical in transverse section as in the case of the universal joint illustrated in FIGS. 7 and 8. The roller balls 40 are received in circular apertures in the head portion 42 of the inner joint member 25. It can be seen that as the inner joint member or pintle is articulated, as soon as the inner joint member articulates to an axis away from the axis of the outer joint member, the plane of torque transmission is no longer perpendicular to the axis of the outer joint member because the roller balls 40 pull away from the rectilinear grooves 39. This is possible because of the unrestricted rotation and linear translation (movement) of the roller balls 40 of this invention, a feature not present in the previously discussed prior art devices.

As FIG. 12 shows, when the constant velocity universal joint is at rest one of the roller balls 40 pulls substantially out of the groove 39, while the remainder of the roller balls 40 are held against the grooves by gravity. However, as shown in FIG. 13, as soon as the joint starts to rotate, because of circumferential forces, the roller balls 40 all assume a position approximately equidistant from the axis of rotation of the inner joint member 25 and all are slightly out of the rectilinear grooves 39. As can be seen, the point of torque transmission in this situation becomes a point-to-point contact at approximately the same position, respectively, between the roller balls 40 and each of the rectilinear grooves 39. It is believed that the moment arm from the center of rotation to the point T, for the present invention, is smaller than any of the previously discussed prior art devices thereby providing for more efficient and smoother torque transmission. This feature, coupled with the unrestricted rotation of the balls as the joint is rotated, provides for lower frictional forces also, making the present joint a substantial advance over the prior art.

A version of the present invention as embodied in a double constant velocity universal joint can be seen in FIG. 14. The double constant velocity universal joint shown in FIG. 14 consists of a drivershaft, generally designated by the numeral 55; a barrel race, generally designated by the numeral 56; and a driver, generally designated by the numeral 57.

The driveshaft 55 has a squared off extension portion 54 for ease of attachment to other devices, and is provided with the standard detent ball 58 which is spring-loaded as described hereinbefore. Of course, the extension portion 54 could also be round, and this would be the preferred configuration in the case of a universal joint intended to be connected to the driveshaft of a motor, for example. In any case, a head portion 63 of the driveshaft is similar to the single constant velocity universal joint just described in that it has a plurality of circular apertures 67 spaced equidistantly around the head portion to receive a plurality of roller balls 65. As before, there is ball-to-ball contact between the roller balls 65 as in the single constant velocity universal joint. The driveshaft 55 is inserted into the barrel race 56 and one of the identical end caps 61, which was placed over the head portion 63 of the driveshaft 55 before the roller balls 65 were inserted, is press-fit onto a barrel 53. A position pad 62 is then inserted, and a second identical end cap is placed over the head portion 64 of the driver 57, the identical roller balls 65 are placed in identical circular apertures 67, and then the end cap 61 is press-fit onto the barrel 53. In the illustrated embodiment there are three roller balls 65 in the driveshaft and the driver and, therefore, there will be three equally spaced rectilinear grooves 66 in the barrel 53. As before, the dimensions across the grooves are of importance. When the axis of the driveshaft and/or driver are in alignment with the axis of the barrel the dimensions across the roller balls 65 and the rectilinear grooves 66 must be such as to provide a rolling plunge fit.

Likewise, the dimension of the position pad 62 is important. As before, this position pad is preferably made of resilient material, such as duro nitrile, and must be of a sufficient dimension such that when the end caps 61 are in place it exerts sufficient force against the head portion 63 of the driveshaft and the head portion 64 of the driver 57 so that the driver and the driveshaft will hold any angle they are placed at under their own weight. If desired, a hole 70 may be placed in the position pad 62. To complete the construction, a socket 59 having a standard detent 60 is provided in the driver 57.

Figure 15:
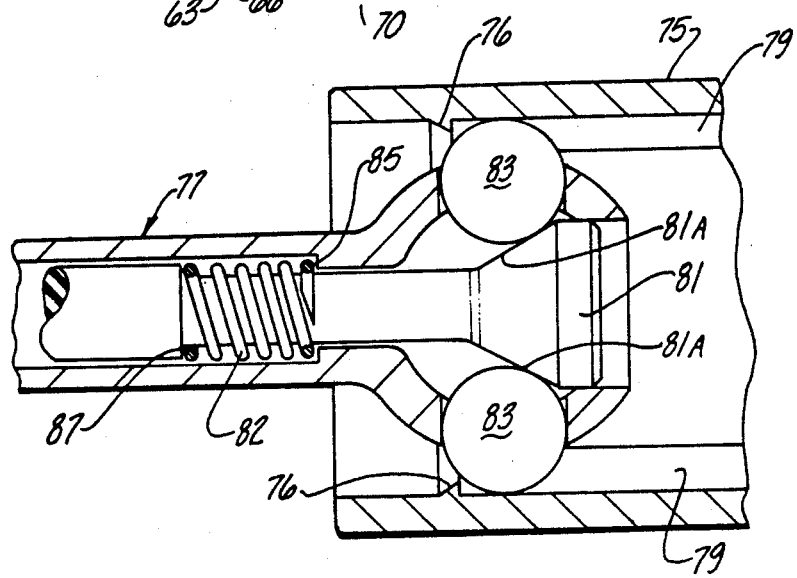
FIG. 15 is an elevational view partly in section of a single constant velocity universal joint having the quick disconnect feature of the present invention.
Figure 16:
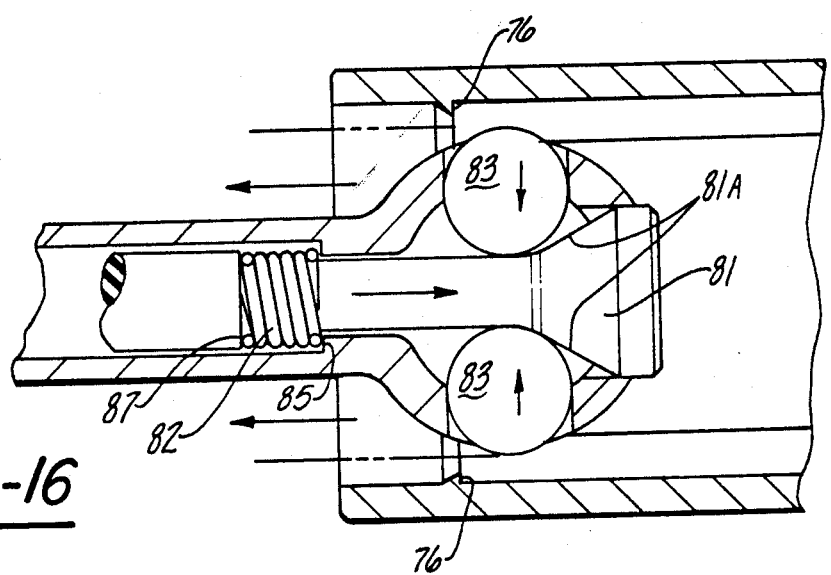
FIG. 16 is a view identical to FIG. 15 but showing the plunger of the inner joint member in its activated position so that the roller balls may drop inwardly toward the plunger and the inner joint member may be removed from the outer joint member.

In embodiments where a quick disconnect version of a constant velocity universal joint is required, the version of the invention shown in FIGS. 15 and 16 may be used. For ease of illustration, there is shown a version of the universal joint of the present invention having two roller balls, but it should be understood that versions having three and four roller balls, such as those just described, or any practical number, may also be constructed in this manner.

In the quick disconnect universal drive shown in FIGS. 15 and 16, as before, there is an outer drive member 75 having a plurality of right circular cylindrical rectilinear grooves 79 into which roller balls 83 are received. Deformations 76 are provided for the purposes previously described, but in this instance the inner drive member 77, because of its construction, can permit the roller balls 83 to move inwardly toward the center of the joint a distance sufficient to clear the deformations 76. This is accomplished by having the inner drive member being hollow in construction and being provided with a plunger 81 having an inclined surface 81A against which the roller balls 83 rest. The plunger 81 is received in the hollow interior of the inner drive member 77 and is retained in its retracted position by a spring 82 which is shown in its normally extended position in FIG. 15. Since the spring is retained between a bearing portion 85 on the interior of the inner drive member and a land 87 provided on the plunger 81, when the plunger is pushed in a direction toward the outer drive member 75, the spring 82 will compress allowing the plunger to move in an axial direction toward the outer drive member, and the roller balls 83 to collapse toward the axis of the plunger. Because of the dimensions of the plunger, the roller balls 83 move inwardly sufficiently to clear the deformations 76, thus allowing the disassembly of the inner drive member 77 from the outer drive member 75, as illustrated in FIG. 16.

Thus, by abandoning prior art techniques, which require the rotation of the roller balls to be restricted, a novel constant velocity universal joint is provided. It should be understood that the invention is not limited to the foregoing embodiments, and that many changes and modifications can readily be made by one skilled in the art without departing from the scope of the claims appended hereto.

What is claimed is:

1. A quick disconnect constant velocity universal joint for transmitting a driving torque, comprising:
    a hollow inner joint member having an axis of rotation, said hollow inner joint member having an outer spherical surface and a plurality of radial apertures provided through its walls along a common plane transverse to said axis of rotation;
    a plurality of roller balls, one disposed in each of said radial apertures, said roller balls being free to move in said radial apertures in a radial direction from a first predetermined innermost position to a second predetermined outermost position;
    an outer joint member having a cylindrical portion for receiving said outer spherical surface of said hollow inner joint member therein, the internal surface of said cylindrical portion having a plurality of rectilinear grooves provided therein, one groove for each of said plurality of roller balls; and
    plunger means for operatively connecting said plurality of roller balls to said plurality of rectilinear grooves, said plunger means disposed in said hollow inner joint member for positioning said plurality of roller balls, said plunger means having a straight tapered portion near one end thereof and resilient biasing means for displacing and plurality of roller balls from said first predetermined innermost position permitting said hollow inner joint member and said outer joint member to be separated from each other to said second predetermined outermost position into said plurality of grooves to operatively connect said hollow inner joint member with said outer joint member, said plurality of roller balls being in continuous contact with said straight tapered portion at said second predetermined outermost position such that as said hollow inner joint member articulates with respect to said outer joint member, said plurality of rollers balls move along said straight tapered portion of said plunger means to maintain intimate contact with said plurality of rectilinear grooves of said outer joint member.

2. The quick disconnect constant velocity universal joint of claim 1 having a plurality of deformations provided in said plurality of grooves to lock said hollow inner joint member in said cylindrical portion of said outer joint member when said plunger means is in said first predetermined outermost position.

3. The quick disconnect constant velocity universal joint of claim 1, wherein said plurality of radial apertures are equally spaced about said hollow inner joint member and said plurality of grooves are equally spaced about the inner surface of said cylindrical portion.

4. The quick disconnect constant velocity universal joint of claim 1, wherein each of said rectilinear grooves has a cylindrical cross-section.

5. The quick disconnect constant velocity universal joint as claimed in claim 1 further comprising:
 a tool attached to said quick disconnect constant velocity joint to define a tool drive.

6. The quick disconnect constant velocity universal joint of claim 5 wherein said tool has means for connecting and disconnecting said inner joint member from said tool.

7. The quick disconnect constant velocity universal joint of claim 5, wherein said inner joint member is integral with said tool.

8. The quick disconnect constant velocity universal joint of claim 5, wherein said tool is a wrench.

9. The quick disconnect constant velocity universal joint of claim 5, wherein said tool is a ratchet wrench.

10. A shaft coupling system for connecting the output shaft of a source of rotary power to the input shaft of a device to be driven comprising:
 a hollow inner member connected to one of said input and output shafts, said hollow inner member having an axis of rotation, an outer spherical surface and a plurality of radial apertures disposed through the walls of said hollow inner member along a plane transverse to said axis of rotation;
 a plurality of roller balls, one disposed in each of said plurality of radial apertures, said plurality of roller balls being free to move in said radial apertures in a radial direction from a first innermost position to a second outermost position;
 an outer member connected to the other of said input and output shafts, said outer member having a cylindrical portion receiving said outer spherical surface of said hollow inner member, the internal surface of said cylindrical portion having a plurality of rectilinear grooves provided therein, one groove for each of said plurality of roller balls; and
 displaceable means for operatively connecting said plurality of roller balls to said plurality of rectilinear grooves, said displaceable means disposed in said hollow inner member for operatively engaging said plurality of roller balls, said displaceable means having a conical portion engaging said plurality of roller balls, said displaceable means further having resilient biasing means for biasing said plurality of roller balls to a first position radially displacing said plurality of roller balls outwardly, one into each of said plruality of grooves, to operatively connect said hollow inner member with said outer member, said displaceable means further being displaceable to a second position permitting said roller balls to be displaced inwardly permitting said hollow inner member and said outer member to be separated from each other, said plurality of roller balls being in continuous contact with said conical portion at said second outermost position such that as said hollow inner member articulates with respect to said outer member, said plurality of roller balls move along said conical portion of said displaceable means to maintain intimate contact with said plurality of rectilinear grooves of said outer member.

* * * * *